United States Patent [19]
Braglia et al.

[11] Patent Number: 5,656,056
[45] Date of Patent: Aug. 12, 1997

[54] METHOD FOR THE FABRICATION OF FLUORIDE GLASS SINGLE MODE OPTICAL FIBERS WITH FLOWING OF AN ETCHANT THROUGH THE FIBER PREFORM

[75] Inventors: Marco Braglia, Turin; Giuseppe Cocito, San Giusto Canavese, both of Italy

[73] Assignee: Cselt-Centro Studi E Laboratori Telecomunicazioni S.P.A., Torino, Italy

[21] Appl. No.: 362,661

[22] Filed: Dec. 22, 1994

[30] Foreign Application Priority Data

Mar. 16, 1994 [IT] Italy ................. TO94A0186

[51] Int. Cl.$^6$ ........................... C03B 37/12
[52] U.S. Cl. ............... 65/382; 65/404; 65/429; 65/388; 65/31; 216/97; 216/24
[58] Field of Search ............... 65/388, 404, 429, 65/382, 31; 216/95, 93, 24

[56] References Cited

U.S. PATENT DOCUMENTS

| | | | |
|---|---|---|---|
| 4,056,428 | 11/1977 | Harada | 216/93 |
| 4,292,063 | 9/1981 | Abe | 65/31 |
| 4,493,721 | 1/1985 | Auwerda | 65/31 |
| 4,898,777 | 2/1990 | Kindler | 65/429 |
| 5,055,120 | 10/1991 | Tran et al. | |
| 5,152,816 | 10/1992 | Berkey | 65/31 |

FOREIGN PATENT DOCUMENTS

| | | |
|---|---|---|
| 0 247 322 | 12/1987 | European Pat. Off. |
| 0 323 635 | 7/1989 | European Pat. Off. |
| 2 104 225 | 3/1983 | United Kingdom |

OTHER PUBLICATIONS

Journal of Materials Science Letters, vol. 10, No. 4, 15 Feb. 91 pp. 241–242, W. J. Cho et al.

Journal of Lightwave Technology, vol. LT-2 No. 5, Oct. 1984, NY, pp. 593–596, Oshi et al.

Siemens Forschungs Und Entwicklungsberichte, vol. 17, No. 3, Mar. 1988, pp. 147–153, Schneider et al.

Nagafune English Abstract of JP 62–265140 Nov. 1987.

Electronic Letters, vol. 22, No. 20, 25 Sep. 86, pp. 1034–1035, Y. Oshi et al.

Suhir Interfacial Shearing Stress in Pullout Testing of Dual–Coated Optical fiber, Journal of Lightwave Technology, vol. 11, No. 12, Dec. 1993 pp. 1905–1913.

Efoc/Lan90—The Seventh European Fibre Optics Communications and Local Area Networks Exposition—pp. 77 to 80 Anelli et al Measurements of Some Physical Characteristics of the coaty.

Suhir Applied Optics/vol. 29, No. 18/ Jun. 20, 1990—pp. 2682 to 2685 Buffering effects of fiber coating and its influence on the proof.

*Primary Examiner*—John Hoffmann
*Attorney, Agent, or Firm*—Herbert Dubno

[57] ABSTRACT

Fluoride glass optical fibers are fabricated by minimizing the number of high-temperature operations. A tube comprising an external layer of a first fluoride glass of composition suitable to form the cladding of the fiber and an internal layer of a second fluoride glass of composition suitable to form the core of the fiber is prepared by a conventional rotational casting technique. Then, the internal layer is thinned by means of chemical etching at ambient temperature until the attainment of a ratio between the volumes of the two layers that corresponds to the ratio between the core and cladding diameters required for a single mode fiber, and the resulting tube is drawn.

4 Claims, 2 Drawing Sheets

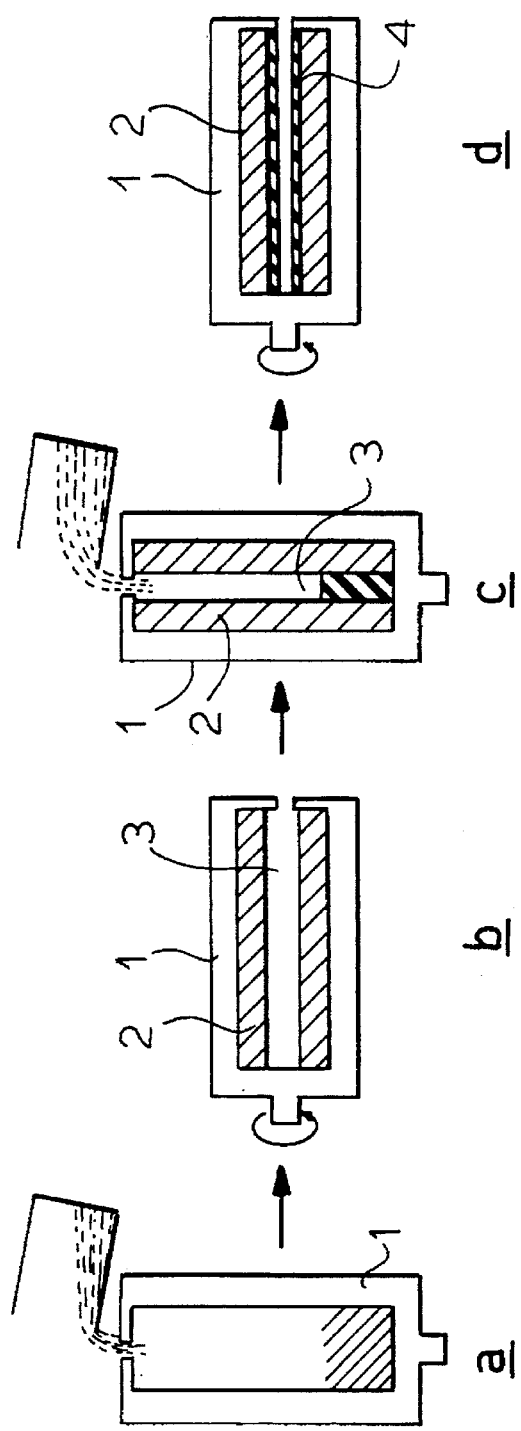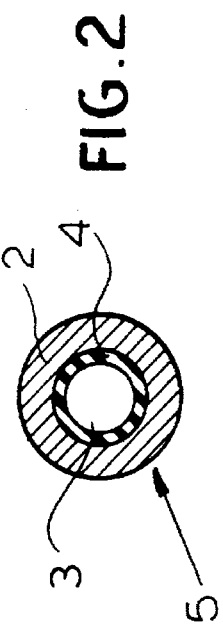

METHOD FOR THE FABRICATION OF FLUORIDE GLASS SINGLE MODE OPTICAL FIBERS WITH FLOWING OF AN ETCHANT THROUGH THE FIBER PREFORM

FIELD OF THE INVENTION

The invention described herein relates to optical fibers for telecommunications, and, more particularly, to a method for the fabrication of single mode optical fibers in fluoride glass.

BACKGROUND OF THE INVENTION

It is well known that single mode optical fibers in fluoride glass intended for manufacturing high-efficiency optical amplifiers require a ratio between core and cladding diameters of the order of 1:100. Taking into account that the diameter of the cladding of these fibers must correspond with that of a conventional optical fiber for telecommunications (typically 125 μm), for obvious reasons of compatibility, this means that the diameter of the core must be slightly larger than 1 μm (typically, about 1.5 μm).

Current methods for the production of preforms for fluoride glass fibers (e.g. those known in the art as "rotational casting" or "build in casting" and others) do not allow obtaining diameter ratios of the aforementioned order of magnitude, but only ratios of the order of 2-3: 10. Actually, on the one hand it is not possible to form cores whose diameter is less than a few millimeters and, on the other hand, the maximum diameter of the cladding must not exceed about ten millimeters, as larger diameters cause glass stability problems and do not allow drawing the preform.

For this reason, the techniques generally utilized to produce single mode optical fibers in fluoride glass entail, before drawing the preform, "stretching" it and subsequently coating the stretched preform with a tube of the same composition as the cladding. The stretching causes a reduction of the overall diameter of the initial preform (and thus of the core); coating with the tube, which comes to be part of the cladding, allows increasing the ratio of the cladding diameter to the core diameter.

It may be necessary to repeat the stretching and coating operations several times before obtaining the desired diameter ratio. The final preform is then drawn, generally after having been collapsed. An example of this technique is described in the paper "Fabrication of single mode ZBLAN optical fibers", by W. Andrews, D. Coulson and G. Rosman, Journal of Non-Crystalline Solids 140 (1992), pages 281–284.

This technique requires repeated operations at a temperature higher than the glass transition temperature of the material (more particularly, in addition to the manufacturing and drawing of the preform, a heating is required for each stretching of the preform and each coating with a tube), and this gives rise to processes of crystallization or de-vitrification of the glass matrix, thereby worsening the mechanical and optical characteristics of the fiber. The presence of additional interfaces, created by the coating of the stretched preform, also contributes to worsen the mechanical and optical characteristics of the fiber.

SUMMARY OF THE INVENTION

According to the invention, a method is provided wherein the number of heating phases required to attain the final fiber is reduced and wherein the formation of additional interfaces is not necessary.

The method according to the invention comprises the steps of:

fabricating a tube made up of an external layer of a first fluoride glass of a composition suitable to form the cladding of the fiber and of an internal layer of a second fluoride glass of composition suitable to form the core of the fiber;

thinning the internal layer by means of chemical etching at ambient temperature, until the achievement of a ratio between the volumes of the internal and external layers of the tube that corresponds to the ratio between the core and cladding diameters required for a single mode fiber; and drawing the tube obtained as a result of the preceding step.

BRIEF DESCRIPTION OF THE DRAWING

The above and other objects, features, and advantages will become more readily apparent from the following description, reference being made to the accompanying drawing in which:

FIG. 1 is a diagram of the steps in a fabrication process of a tube with two layers made of different fluoride glasses;

FIG. 2 is a cross-section of the tube; and

SPECIFIC DESCRIPTION

Figure 3:
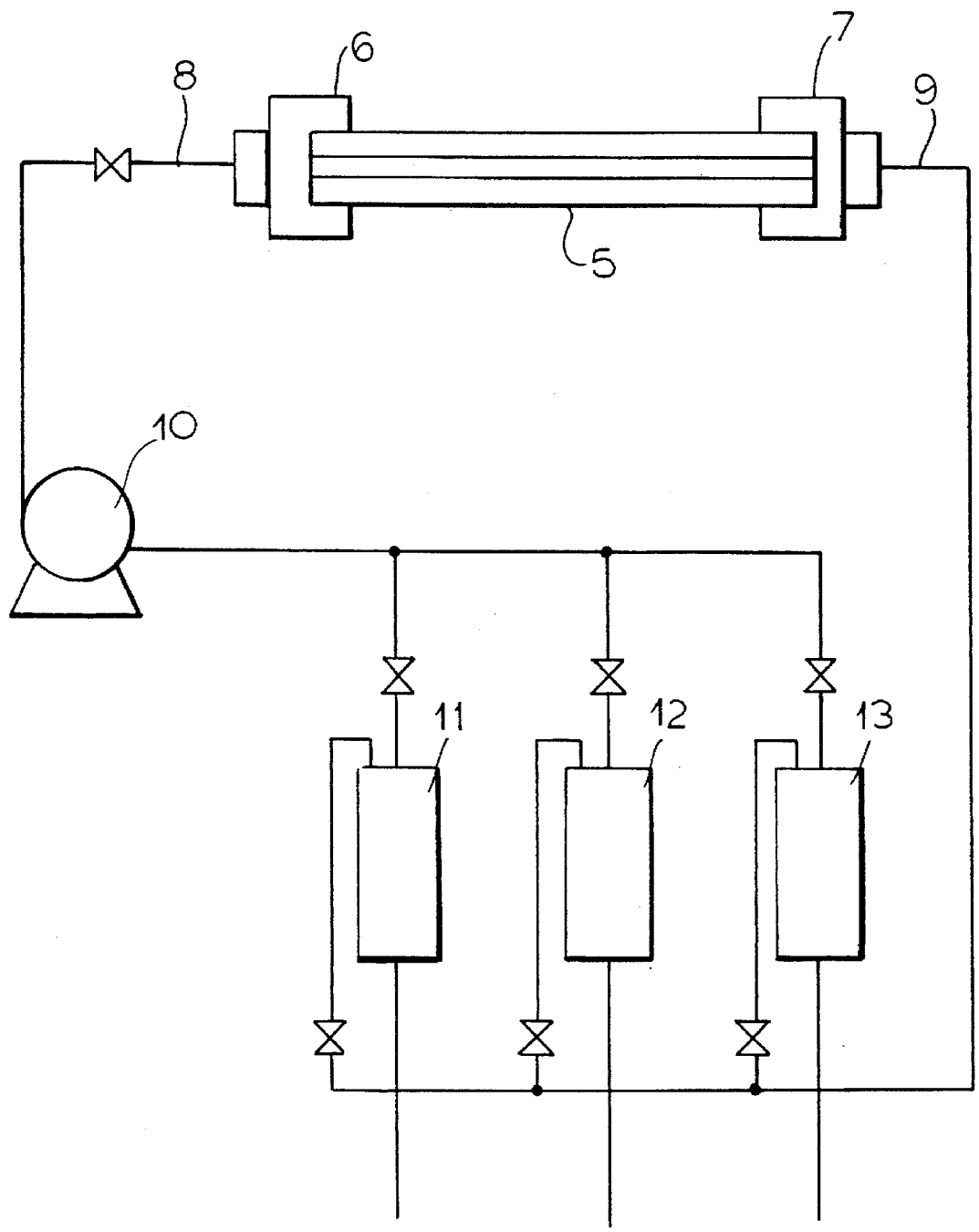
FIG. 3 is a simplified representation of a plant that can be used for thinning the internal layer of the tube in FIG. 2 by means of chemical etching.

The method according to the invention comprises, as first step, the fabrication of a tube comprising two coaxial layers, of the material required respectively for the cladding and the core of a fluoride glass fiber. By way of purely indicative example, the cladding may be made up of a ZHBLAN glass (i.e., a glass composed of fluorides of Zr, Hf, Ba, La, Al, Na), while the core may be made up of a ZBLAYNP glass (i.e. a glass composed of fluorides of Zr, Ba, La, Al, Y, Na, Pb). Again by way of non limiting example, it shall be assumed that the tube is prepared by means of the rotational casting technique, though other known techniques conventionally utilized to realize fluoride glass fiber preforms may be used as well. A detailed description of this process is given, for instance, by D. C. Tran et al. in "Fluoride glass preforms prepared by a rotational casting process", Electronics Letters, Vol. 18 (1982), pages 657 and following.

This being stated, to form the tube, the mixture of constituents of the glass of the cladding is poured into a mold 1, preheated to a temperature close to the glass transition temperature. Mold 1 should have an internal diameter such that the external diameter of the resulting tube is compatible with the drawing requirements, thus a diameter of the order of about 10 millimeters (e.g. 8–12 mm). The mold is rapidly rotated (e.g. at 3000 rpm or more) in a crucible so as to obtain a tube 2 (phases a, b in FIG. 1), which shall make up the external layer of the final tube. The amount of material should be such as to form a layer 3.5–4.5 mm thick. In this way there are no problems for the subsequent formation of the layer intended to create the core of the fiber, taking into account that generally the diameter of the axial hole of a tube obtainable with this technique is not less than a few millimeters (e.g. 2–3 mm). Once layer 2 is solidified, it is heated to the glass transition temperature, the molten mixture of the constituents of the glass of the core is poured into axial hole 3, and mold 1 is rotated, as before, to create an internal layer 4 of the tube (phases c, d). The mount of material poured for the core mixture shall be such as to form for instance a layer that is, at most, 0.5–1 mm thick. A cross-sectional representation of the final tube 5 is shown in FIG. 2.

The subsequent step consists in thinning internal layer 4 to reduce its thickness to a value equal to about 1/100 that of the external layer (thus, to about 30–40 mm), so that, in the tube to be drawn, the ratio between core and cladding diameters is the ratio required for the realization of a single mode fiber.

The plant for carrying out this thinning is represented in an extremely simplified form in FIG. 3. The two ends of tube 5 are mounted in teflon joints 6, 7 to be connected to intake duct 8 for the materials necessary for treatment of the tube and to exhaust duct 9 for the used material. Duct 8 is connected to a pump 10, specifically a peristaltic pump, which, depending on the work phases, takes from respective tanks 11, 12, 13 and sends into tube 5 a chemical etching solution, or water, or yet an alcohol, as explained below. Duct 9 takes back into the respective tanks the chemical etching solution, containing the material getting removed, the water and the alcohol. For an understanding of the invention it is not necessary to describe in further detail the structure of the plant.

Suitable chemical etching solutions are, for instance, solutions of HCl and $ZrOCl_2$ or of $HNO_3$, $H_3BO_3$ and HCl. In exemplary embodiments of the invention, the concentrations of the components of the first solution were 1 M for HCl and 0.4 M for $ZrOCl_2$, and those of the components of the second solution were 1 M for HCl, 0.5 M for $H_3BO_3$, and 1 M for $HNO_3$. With the above concentrations, the first solution has an etching rate on the core material of the order of 400 m/h in static conditions (i.e. in case of mere immersion in the solution), and the second one has an etching rate of the order of 1200 m/h, again in the same conditions. Given the initial thicknesses indicated for internal layer 4, it can be seen that the times required to achieve the final thickness are reasonably short, compatible with the needs of an industrial production it should be noted, moreover, that etching velocity in the dynamic conditions adopted in the present invention is obviously much higher than that which can be achieved in static conditions.

The etching solution is passed inside the tube at ambient temperature, and this is an essential characteristic of the present invention. Once the desired thickness is attained, pump 10 is disconnected from tank 11 of the etching solution and connected to tank 12 so as to pass rinsing water, also at ambient temperature, through tube 5. Subsequently, the pump is disconnected from tank 12 and is connected to tank 13 so as to pass the alcohol (advantageously methyl or isopropyl alcohol) through tube 5 for water removal.

At this point the tube is ready for the drawing, for which a light vacuum can be applied inside the tube in order to avoid possible formation of bubbles.

Drawing a tube rather than a solid structure like a conventional preform presents the advantage that a higher volume of material may be drawn at a given temperature and for a given thermal gradient between the surface and the center of the tube or, vice versa, for drawing a given quantity of material, a lower thermal gradient is sufficient. A larger volume of material obviously allows long fibers to be obtained while a lower gradient helps improve quality.

As can be seen, the high temperature operations required by the process according to the invention are those inherent to forming and drawing the tube, as in the conventional processes wherein an actual preform is manufactured and drawn. The operations needed to obtain the desired dimensional ratio between cladding and core in the intermediate product to be drawn are instead carried out at ambient temperature, thus eliminating the heating phases required, according to the conventional technique, for stretching the preform and for coating it with a tube of the same material as the cladding. Moreover, the direct drawing of the tube, without collapsing it, eliminates a further heating phase of the materials.

It is evident that what has been described is given by way of non-limiting example and that variations and modifications are possible without departing from the scope of the invention.

We claim:

1. A method of fabricating a fluoride glass single mode optical fiber, comprising the steps of:
    (a) fabricating by rotational casting a tube having an external layer of a first fluoride glass of a composition suitable to form a cladding of a single mode optical fiber and, an internal layer of a second fluoride glass of a composition suitable to form a core of the fiber;
    (b) thinning the internal layer by chemical etching to obtain a ratio of thicknesses of the internal layer and the external layer corresponding to a ratio between the diameters of the core and cladding required for said single mode fiber, the thinning being carried out by:
        ($b_1$) connecting ends of said tube to a source of a chemical etching solution, a source of water, and a source of an alcohol for introducing into said tube in succession said chemical etching solution, said water, and said alcohol, and for recycling the chemical etching solution, the water and the alcohol to the respective sources; and
        ($b_2$) circulating through said tube:
            (i) in a first operating phase the chemical etching solution for a time required to reduce a thickness of the internal layer to a thickness in accordance with said ratio of the thicknesses;
            (ii) in a second operating phase the water for rinsing the tube;
            (iii) in a third operating phase the alcohol for eliminating residual water from the tube, the chemical etching solution, the water and the alcohol being at an ambient temperature while passing through the tube; and
    (c) drawing said fiber from the said tube.

2. The method defined in claim 1 wherein said chemical etching solution is a solution of HCl and $ZrClO_2$ or is a solution of $HNO_3$, $H_3BO_3$ and HCl.

3. The method defined in claim 1 wherein in said drawing of said fiber, said fiber is directly drawn from said tube without prior collapse of said tube.

4. The method defined in claim 3, further comprising generating a vacuum in said tube during the drawing of said fiber therefrom.

* * * * *